United States Patent

Meyer

[15] 3,668,529

[45] June 6, 1972

[54] MEASURING CLOSELY SPACED PULSES USING TIME EXPANSION

[72] Inventor: Jack R. Meyer, Columbia Heights, Minn.

[73] Assignee: Honeywell Inc., Minneapolis, Minn.

[22] Filed: Jan. 11, 1971

[21] Appl. No.: 105,582

[52] U.S. Cl..............................328/129, 307/293, 328/127, 328/146, 330/30 D
[51] Int. Cl. ......................................................H03k 17/28
[58] Field of Search ..................307/228, 293; 328/127, 129, 328/146, 151, 181; 330/30 D

[56] References Cited

UNITED STATES PATENTS

| | | | |
|---|---|---|---|
| 2,997,601 | 8/1961 | Taylor, Jr. et al.................. | 328/129 X |
| 3,053,996 | 9/1962 | Stefanov................................ | 307/228 |
| 3,105,939 | 10/1963 | Onno et al. .......................... | 328/146 X |
| 3,244,989 | 4/1966 | Carlson................................ | 328/146 X |
| 3,348,216 | 10/1967 | Vinson.............................. | 328/151 X |

Primary Examiner—Donald D. Forrer
Assistant Examiner—R. C. Woodbridge
Attorney—Charles J. Ungemach, Ronald T. Reiling and James A. Phillips

[57] ABSTRACT

Apparatus for measuring the time between first and second pulses where the time is expanded by comparing the voltage held in a first fast ramp generator with that being developed by a second slow ramp generator. The expanded time is directly proportional to the actual time between pulses and is used to gate a clock, providing a digital signal proportional to the actual time.

4 Claims, 2 Drawing Figures

PATENTED JUN 6 1972

3,668,529

INVENTOR.
JACK R. MEYER
BY Charles J. Ungemach

MEASURING CLOSELY SPACED PULSES USING TIME EXPANSION

BACKGROUND

The invention pertains to time to digital converters and more particularly to apparatus for measuring a small time interval between two pulses. Prior art circuits having the same resolution (sub-nanosecond) are relatively complex and costly.

SUMMARY

A fast ramp generator converts the time between first and second pulses to a voltage which is held while, beginning with the first pulse, a slow ramp is also operating and generating a voltage. When the slow ramp voltage equals the held voltage of the fast ramp a third pulse is generated, the time between the first and third pulses representing a directly proportional expansion of the time between the first and second pulses. The first and third pulses are then used to gate a clock, providing a number of gated clock pulses which is proportional to the time between the first and second pulses.

DESCRIPTION OF THE PREFERRED EMBODIMENTS

Figure 1:
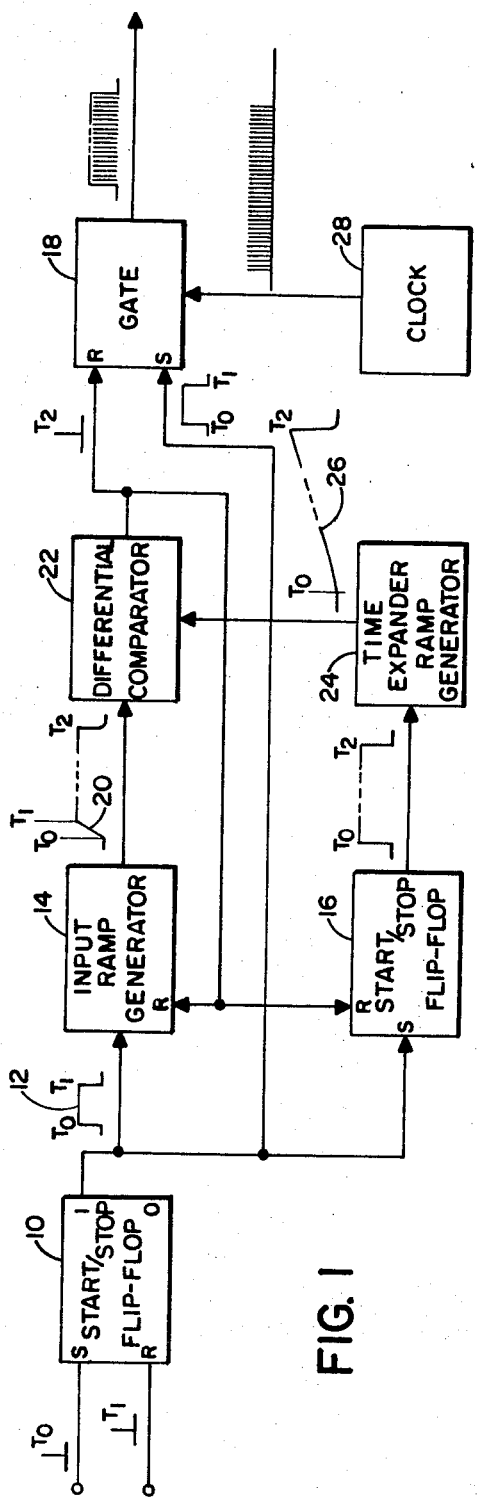
FIG. 1 is schematic block diagram of the time-to-digital converter and FIG. 2 includes a number of waveforms occurring in the converter of FIG. 1.
Figure 2:
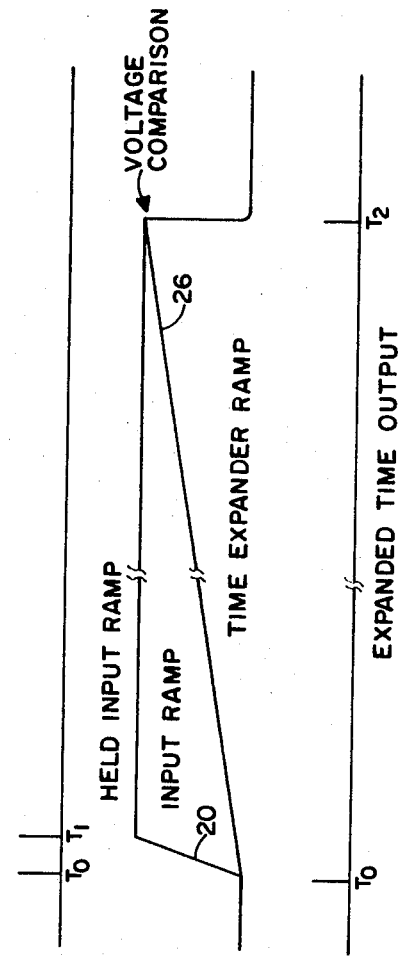

The input to the apparatus of FIG. 1 comprises first and second pulses occurring at time T0 and T1 respectively. The T0 and T1 pulses are relatively narrow. These pulses are applied to a flip-flop 10, the T0 pulse setting flip-flop 10 and the T1 pulse resetting the flip-flop. The output of flip-flop 10 is a square pulse 12 of duration T1–T0. Pulse 12 is applied to the input terminal of an input ramp generator 14, to the set terminal of a start-stop flip-flop 16, and to the set terminal of a gate 18.

The output of ramp generator 14 is a relatively rapidly increasing ramp voltage 20 starting at time T0 and increasing until time T1. A typical slope for ramp 20 may be 1 volt per 10 nanoseconds. Thus if T1–T0 equals 35 nanoseconds, voltage ramp 20 will build up from 0 volts to 3.5 volts. The instantaneous voltage of ramp 20 at time T1 is held in a capacitor or other memory device and applied to the first input of a differential comparator 22.

Pulse 12 sets start-stop flip-flop 16 and the output thereof initiates the action of a time expander ramp generator 24. Beginning at time T0, ramp generator 24 generates a relatively slowly increasing ramp voltage 26 which is applied to the second input of differential comparator 22. The slope of ramp 26, for example, may be 1 volt per microsecond. When the voltage of ramp 26 is equal to that held by ramp generator 14, differential comparator 22 generates a third pulse T2. Pulse T2 resets gate 18, input ramp generator 14, and start-stop flip-flop 16. Pulses from a clock 28 are passed through gate 18 starting when gate 18 is set at time T0 by the leading edge of pulse 12 and ending with pulse T2. The output of gate 18 is a set of gated clock pulses the number of which is proportional to the time between the T0 and T1 pulses and which can be used for a number of different purposes.

An example will clarify the operation. Assume that the time between pulses T1 and T0 is 35 nanoseconds, that the slope of ramp 20 is 1 volt per 10 nanoseconds, that the slope of ramp 26 is 1 volt per microsecond and that the frequency of clock 28 is 50 megacycles per second. Ramp 20 then goes from 0 to 3.5 volts which is then held in the memory. Ramp 26 begins increasing at the rate of 1 volt per microsecond until 3.5 volts is reached at the end of 3.5 microseconds. Thus pulse T2 occurs 3.5 microseconds after the leading edge of pulse 12 and gate 18 is open for 3.5 microseconds. During this time about 175 pulses from clock 28 are passed through gate 18. Gate 18 is open for 3.5 microseconds which is equivalent to 3,500 nanoseconds. In this way the 35 nanoseconds present between pulses T1 and T0 is expanded by a factor of 100 at gate 18. Thus with a given clock, resolution is increased.

Many individual circuits which can be used for the individual blocks of this apparatus will occur to those skilled in the art. In addition, many modifications of the basic invention will occur to those skilled in the art and it is intended therefore that the invention is to be limited only by the following claims.

I claim:

1. Apparatus for indicating the time spacing between first and second pulses comprising:
    means responsive to the first pulse for generating a first ramp signal with a first predetermined slope and responsive to the second pulse for storing the magnitude of the ramp signal present at the time of the second pulse;
    means responsive to the first pulse for generating a second ramp signal with a second predetermined slope, less than the first predetermined slope;
    means responsive to the stored magnitude of the first ramp signal and the instantaneous magnitude of the second ramp signal, comparing them and generating a third pulse when they are equal;
    clock means providing periodic pulses; and,
    means responsive to the first and third pulses for gating the pulses from the clock means during the time between the first and third pulses, the gated pulses being a digital representation of an expanded time which is proportional to that between the first and second pulses.

2. The apparatus of claim 1 wherein the first recited means includes a ramp generator actuated by a flip-flop which is set by the first pulse and reset by the second pulse.

3. The apparatus of claim 1 wherein the second slope is about 1/100th of the first slope.

4. The apparatus of claim 3 wherein the first slope is about 1 volt/10 nanoseconds and the second slope is about 1 volt/microsecond.

* * * * *